Feb. 10, 1953 — W. A. WERNER — 2,628,339
PORTABLE FLASHLIGHT WITH STORAGE BATTERY AND RECTIFIER
Filed Nov. 1, 1948 — 2 SHEETS—SHEET 1

Inventor
Walter Arthur Werner
By Clarence A. O'Brien
and Harvey B. Jacobson
Attorneys

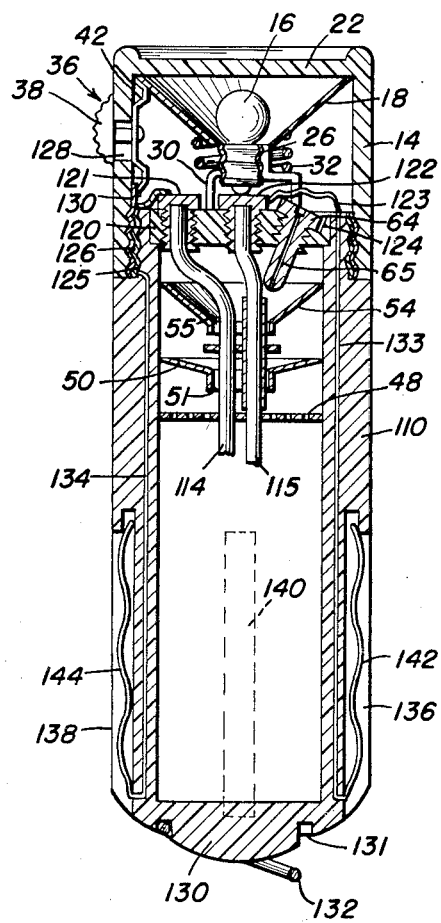

Patented Feb. 10, 1953

2,628,339

UNITED STATES PATENT OFFICE 2,628,339

PORTABLE FLASHLIGHT WITH STORAGE BATTERY AND RECTIFIER

Walter Arthur Werner, Fort Wayne, Ind.

Application November 1, 1948, Serial No. 57,763

4 Claims. (Cl. 320—2)

This invention relates to a portable flashlight, combined with a rechargeable battery and it has for its main object to provide a flashlight of this type which is not only simple, light and sturdy in its construction but which may be serviced without any skill, knowledge or special attention by manipulations which are of the most simple type and which may be performed by any person capable of taking care of the customary electric household objects.

It is a well known fact that flashlights supplied with current by dry cells are not easily kept in operative condition outside of cities, or on the road where they are most needed, because dry cells have not only a very limited service period, but also a very limited storage period.

Flashlights operated by secondary or storage batteries have therefore been repeatedly proposed, but a large number of difficult problems have first to be disposed of to simplify the recharging operation to such a degree that no skilled operator or special attention is needed. Moreover storage batteries need refilling at intervals and have to be accessible. On the other hand leakage which is extremely difficult to prevent, is not only very damaging to objects coming into contact with the acid or lye contained in the battery, but also entails repeated refilling. The prevention of leakage is especially difficult because during charging the escape of gas has to be permitted.

It is a main object of the present invention to reduce the charging operation to a manipulation which any person handling the usual household appliances can perform and which reduces itself to the plugging in of a connection or to the placing of the flashlight into a bracket or container already connected.

It is a further object of the invention to provide a flashlight construction with a rechargeable electrolyte filled battery which is completely leakage proof.

It is a further object of the invention to provide a flashlight with rechargeable battery in which the need for a refilling with water is immediately noticeable.

It is a further object of the invention to provide a flashlight and battery construction in which the connecting wires leading to and from the electrodes, do not pass through the container wall and in which connections are automatically made by fixing the parts to each other or by insertion into the cup or bracket holding the flashlight.

It is a still further object of the invention to provide charging means which may be used with A. C. and D. C. currents respectively.

Further and more specific objects will be apparent from the following detailed specification.

The invention is illustrated in the accompanying drawings showing several embodiments thereof. It is however to be understood that the embodiments are shown in the drawings by way of example for the purpose of being used to explain the principle of the invention and some modes of applying this principle. The explanations given below supply sufficient information to the expert skilled in this art to apply the principle in a modified way and modifications of the embodiments shown are therefore not necessarily departures from the essence of the invention.

In the drawings:

Figure 3 is an elevational sectional view of a modified flashlight construction.

Figure 4 is a sectional elevational view of the charging cup or sleeve for said modification used in connection with A. C. charging currents.

Figure 6 is a sectional plan view of charging sleeve or cup used in connection with the modification shown in Figure 3 when direct current may be used for charging.

Figure 7 is a perspective view of a charging assembly.

Figure 1:
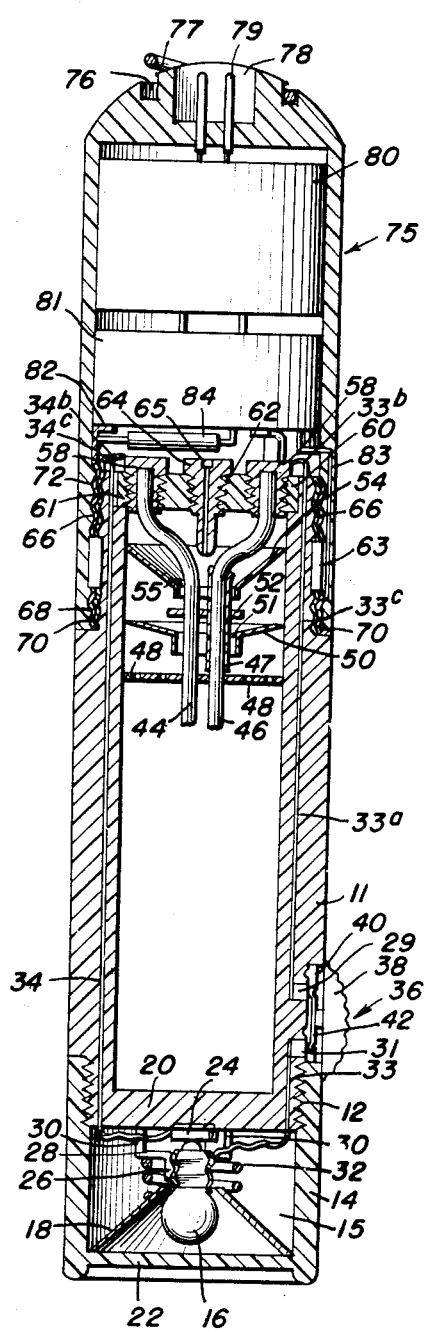
Figure 1 is a sectional elevational view of the flashlight when inserted into a charging cup adapted for use in connection with A. C. charging currents.

Pocket flashlights in which the current is furnished by a secondary or wet cell storage battery, which has to be recharged at intervals have to fulfill a number of different conditions, among which are absolute fluid tightness preventing escape of the electrolyte, and easy rechargeability by persons not acquainted with electrical devices. Complete fluid tightness, moreover, should not prevent the refilling with water and the fact that the storage battery needs refilling should be easily recognizable. The recharging in most cases takes place when the flashlight is out of use, and should not entail any special operation to be performed by the user. It must also be the same whatever the character of the current which happens to be supplied.

In order to fulfill these and other various requirements the flashlight according to the invention consists of a storage cell container section 11 made of transparent or translucent plastic which also forms the body member and handle of the flashlight. This container section 11 is provided with screw threads 12 at one end, into which the threads of a cap 14 are fitted enclosing a cylindrical compartment 15 within which the bulb 16 and reflector 18 are housed. The cap is preferably made of transparent plastic which may or may not have a bottom portion 22 shaped so as to form a lens.

As seen in Figure 1 the bottom section 20 of the container section 11 is completely closed and merely carries on the outside a bottom contact in the shape of a small round lead disk 24, preferably held by being molded into said bottom section 20.

Near said central contact disk 24 the sleeve 26 holding the light bulb 16 is placed, which is provided with three or more spider arms 28 projecting from the sleeve but having bent ends forming leg portions 30 on which the sleeve 26 may rest and which are arranged in a circle concentric with the central contact disk 24.

The sleeve may be cylindrical with screw threads pressed into it or may merely consist of segments or of sections into which the contact sleeve of the bulb fits.

Between the spider arms 28 and the reflector 18 a spring 32 is placed and it will be seen that, if the dimension of the reflector opening is properly chosen to coincide approximately with the inner edge of the cylindrical cap, the entire structure is positively held, with the sleeve 26 pressed against the bottom section 20 and centered by the conical reflector and spring.

The electrical connections with the bulb are made by wires 33, 34 which are embedded into the wall of the plastic container and are protruding at the end, where they are bent and are connected with the lead disk 24 and the sleeve 26 respectively.

The container 11 moreover is provided with the button switch generally indicated at 36 which comprises as usual the shiftable button member 38 held in a slot 40 of the container and provided with a spring member 42 which establishes or breaks the connection between small metal plugs 29, 31 connected with the two wire sections 33 and 33a.

The case of the storage battery, as above stated, is the handle forming transparent or translucent container 11, filled with the electrolyte (not shown) and provided with electrodes 44, 46 of which only the upper portions are shown in the figures. These upper portions are bent so as to be near the center of the container and they pass through holes in the central portion of the plastic fluid retainer disk 48 which may be provided with a number of small holes permitting the passage of gases and of liquids but offering a relatively high resistance to the passage of the latter. Above the retainer disk 48 a funnel member 50 is inserted, closing the cross section except for a central opening 51 through which the electrodes 44, 46 pass. Above this central opening a splash baffle 52 is arranged surrounding the electrodes and shielding the central opening of the funnel member 54. A second funnel member 54 is arranged near the upper end of the container 11, provided with a central opening 55 for the passage of the electrodes 44, 46 but otherwise closing the cross section of the container.

As seen in Figure 1 the end portions of the electrodes are bent outwardly so as to space them apart. The end portions enter into closed lead plugs 58 provided with screw threads at their outside which are screwed into a wafer like plug disk 60 closing the end of the container 11. Such closing is obtained by circumferential screw threads 61 on the wafer plug disk 60 engaging internal threads provided in the inner end portion of the container 11.

The wafer plug is made of plastics. It is provided with a central screw threaded hole 62 into which a screw threaded filler plug 64 provided with corresponding outer screw threads is inserted. This filler plug may be provided with a capillary channel 65 permitting the escape of gases, but offering such a resistance to liquids that no escape of a liquid can occur.

One of the two electrodes or both may be covered by an insulating sleeve 47 in the space above the retainer disk, in which the electrodes are very close to each other. This sleeve prevents a short circuiting of the electrodes during refilling or the accidental bridging by an adhering drop of liquid.

The connection of the electrodes with the wires 33a and 34 respectively embedded in the container walls is made by means of the projecting wire ends 33b, 34b which are soldered or otherwise fastened to the lead plugs 58.

The upper end of the container 11 in Figure 1 is stepped or recessed and this stepped portion is subdivided by a further recess or depression 63 so that two separated annular cylindrical portions 66, 68 are set off from each other. They are both lined with a metal sleeve into which round screw threads have been pressed. The metal sleeves are connected with the wires 33a and 34 by short connecting wires 33c and 34c respectively.

The metal sleeves on the annular portions 66, 68 engage correspondingly spaced internal sleeves 70, 72 lining the interior of a charging container or cap 75 which like the container 11, is made of plastics and which is screwed on to the screw threaded sleeves 66, 68 of the container 11 by means of the said sleeves. The two internal screw threaded sleeves may be separated by a recess and may slightly differ in diameter, so as to facilitate mounting and dismounting. They are so spaced that they do not engage the sleeves simultaneously to avoid the possibility of a short circuit.

This charging container 75 is provided at its upper dome shaped end with an annular recess 76 accommodating a ring on which the flashlight may be suspended when carrying it and while charged. A second cylindrical recess 78 accommodates the male contacts 79 of a plug connection. The charging container houses a transformer 80 for reducing the voltage and a rectifier unit 81 consisting of any type of stationary dry rectifier commonly in use. One terminal of the rectifier unit may be directly connected with a prong 82 projecting from sleeve 72, this connection containing the resistance 84 while the second terminal is connected with a wire 83 embedded into the wall of the charging container and leading to the lower sleeve portion 70. It will thus be clear that when the charging container 75 is screwed onto the container 11 connections are established between the electrodes 44 and 46 respectively and the two terminals of the rectifier by means of the sleeves 70, 72, the sleeves lining parts 68 and 66, and the short wire pieces 34c and 33c respectively, the latter piece establishing connection with electrode 46 over wire 33a and 33b.

Any outlet of alternating current of the required voltage, say 115 v., may be used to charge the battery contained in container 11, a cord provided with suitable plug connectors being plugged in so as to connect the contact pins 79 with the outlet.

The charging operation of the battery therefore merely consists in suspending the flashlight on a hook or on a bracket of some kind and in plugging in the cord. The battery then charges itself, transforming and rectifying the current with which the flashlight is supplied in such a manner that the proper voltage is maintained. Moreover the rectifier and the resistance may be so chosen, that a low charging rate can be employed for recharging the battery so that the battery will not be overcharged, and therefore no gas will be developed even during a protracted charging period. This fact is of importance on account of the limited size of the battery. A small amount of gas may obviously escape through the capillary channel of the filling stopper.

Figure 2:
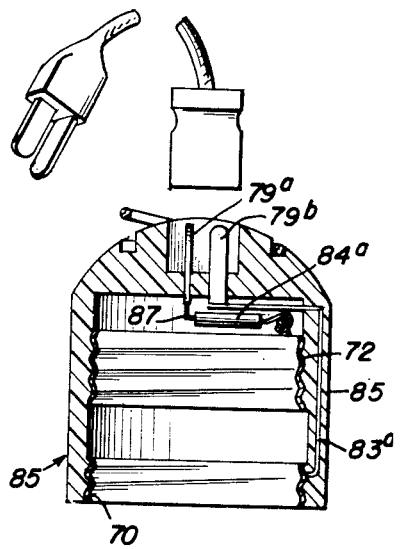
Figure 2 is an elevational sectional view of a charging cup, adapted for service with the flashlight shown in Figure 1 when D. C. currents are used for charging the flashlight battery.
Figure 5:
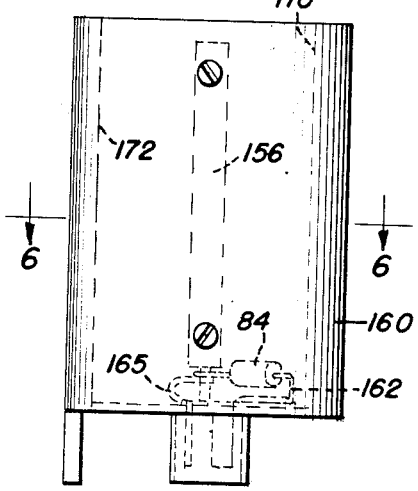
Figure 5 is an elevational side view.

If D. C. should only be available a charging cap 85 (Figure 2) may be used instead of the cap 75. This cap is constructed in the same way except that the transformer and rectifier may be dispensed with while only a resistance 84a is inserted into the connection 87 between pin 79a and sleeve 72. Likewise wire 83a leading from sleeve 70 may be directly connected to pin 79b.

The flashlight may be carried around with or without the charging cap. Obviously the charging cap may be replaced, especially in the case of an A. C. charging cap by an ordinary cap, serving merely as a protection.

Figures 3 to 6 illustrate a modification of the flashlight and secondary battery which, while showing substantially the same construction of the battery and of the flashlight assembly, is adapted for use with stationary charging cups or brackets.

As will be seen from Figure 3 the secondary battery is formed by the container 110 of transparent or translucent material filled with the electrolyte. This container is completely closed at its lower end in Figure 3 and is provided with a wafer disk plug 120 at its upper end at which the lamp 16 is supported. The retainer disk, the funnels and the splash disk are the same as described in conjunction with Figure 1. The electrodes 114 and 115 pass through them and are bent at their ends, but the end of electrode 115 is so bent that it passes exactly through the central portion of the wafer disk plug 120. Both electrodes enter into closed lead plugs 121, 122 which are screw threaded and inserted into bores provided with corresponding threads, in the wafer disk 120. The head of lead plug 122 in the center serves as the central contact of the lamp 16 and is connected by soldering or otherwise with the projecting portion 123 of wire 133 which is embedded in the container wall.

The filler plug 64 provided with capillary channel 65 is inserted laterally and may preferably adopt an inclined position with respect to the axis of the cylindrical container 110. The screw threads in the wafer disk plug receiving said plug may be positioned accordingly and an inclined recess 124 may be provided in the wafer plug disk for accommodating the head of said filling plug.

The upper portion of the container 110 may be stepped and the said stepped portion may be provided with a metal sleeve 125 into which rounded screw threads have been pressed. They engage with a correspondingly threaded internal sleeve 126 mounted on the inside of the cap 14. This cap is made of a completely transparent plastic and is provided with a bottom portion 22 covering the lamp which may or may not be lens shaped.

The lamp 16, reflector 18, sleeve 26, with spider arms and legs 30 and spring 32 are exactly alike to the corresponding parts already described and need no further description. These parts as well as the switch 36 may be so standardized that they are interchangeable with those of other types of flashlights for instance with those of the type shown in Figure 1.

The button switch 36 is carried by the cap and consists of a push button 38 and spring 42 operating in a slot 128 of the cap. The spring in this case when the button 38 is pushed upwardly in Figure 3 makes contact between a prong 130 projecting from sleeve 126 and the reflector 18 which is in operative electric contact with the sleeve 26 by means of spring 32.

It has already been mentioned that the plastic container 110 is completely closed at the lower end 130 which may be dome shaped and is provided with a groove 131 in which a suspending ring 132 may be housed.

The lower part of the container however is provided with a number of longitudinal, axially directed slots or grooves 136, 138, 140. Two of these grooves contain metal springs 142, 144 which are connected with the two wires 133 and 134 respectively. The wire 133 as already described has a projecting end 123 connected with the head of lead plug 122 forming the central contact engaged by the central contact of the lamp 16. The second wire 134 is connected with sleeve 125 which in its turn is connected by a short projecting prong with lead plug 121 of electrode 114. It is thus seen that the two springs 144 and 142 are directly connected with the electrodes 114, 115.

The other slots 140 are guide slots for a purpose to be described.

The flashlight as described cooperates with a charging bracket or charging cup 150 for A. C. charging or with a similar cup 160 for charging with direct current.

The charging cups may have a half cylindrical and half prismatical cross section as shown in Figure 6. The charging cup 150 is provided in its upper portion with longitudinal axially directed ledges 151, 152 on which contact strips 154, 156 are fixed. The ledges may enter the grooves 136 and 138 of the container 110 and fit into them while the contact strips are in active contact with the springs 142, 144.

In the lower part of the cup a rectifier 81, resistance 84 and transformer 80 is housed, with the leads 162, 165 leading to the contact strips 154 and 156, respectively.

The entire cup may be suspended vertically at a point of the wall and in this case fixed connections 166, 168 or connections leading to a wall plug are used. In addition the charging cup may be provided with a plug connector 170.

For D. C. currents a similar charging cup 160 is used arranged in parallel to the contact strips for a purpose explained below which is similar to the one above described but is of a simple construction as the entire lower portion containing transformer and rectifier may be dispensed with. The two leads 162, 165 may in this case be directly connected with the contact strip, with a suitable resistance 84 interposed in one of the leads.

Both charging cups are preferably provided with additional ledges 170, 172 of unequal width, fitting into the guiding slots 140 which are likewise of unequal width of the container 110. The guiding slots preserve the desired polarity of the connection, as the proper electrode is in this way always connected with the conductor of the desired polarity.

It will be clear from the above that in order to charge the flashlight it is simply inserted into the charging cup. It will recharge itself automatically at the desired slow rate. It may be mentioned that the low rate is permissible with flashlights, as the consumption of current is usually extremely light, but that it permits to use a permanently closed battery which needs only refilling with water at long intervals. For such refilling the filling plug has to be unscrewed. The small quantity of water which may accidentally penetrate through the funnels from the inside will not be able to leak out or to do any damage.

On account of the transparent or translucent container which may be provided with suitable marks, the user will be able to notice when the battery needs refilling.

If a large number of flashlights is used which are recharged at the same time, for instance when charging the flashlights which are used by utility meter readers, railroad men and persons in similar occupations the charging may be simplified by using in the event of an A. C. source of current one charging receptacle 150 of the type shown in Figure 4 together with any number of receptacles 160 of the type shown in Figure 5. These additional receptacles are connected by means of cords to the plug 170 of the receptacle 160 as shown in Figure 7. Two or more groups of flashlights connected in parallel, each group containing several cups 160 in series may thus be charged with a single cup 150 containing a rectifier.

It is therefore clear that the manipulation necessary to keep the flashlight permanently operative is of the most simple type. The flashlights have merely to be kept at a certain place customarily during the night or day and will be permanently ready for use. Even with large numbers of flashlights the manipulation is extremely simple. The danger of leakage with consequent damaging consequences has been eliminated by the construction as above described. Likewise the manipulation of recharging needs neither skill nor attention.

It will be finally understood that the unessential details of the construction may be changed without in any way affecting the invention.

Having described the invention, what is claimed as new is:

1. A portable flashlight with rechargeable secondary battery, comprising a transparent container forming simultaneously the handle of the flashlight and the container of the rechargeable battery, said container being provided with inner threads at one end and having an imperforate end wall at the other end, a disk shaped threaded member engaging the threaded end portion of the container closing the container in a fluid tight manner, the disk shaped member being provided with two threaded openings, electrodes having their ends projecting into the said openings of the disk and spaced apart at these ends, said electrodes converging towards and passing through the center of the container in the section adjacent to the spaced ends, a plurality of funnels filling the entire cross section of the container and provided with a central opening, the electrodes passing through said central opening, a fluid retaining disk in said container near said funnels, provided with small holes and with a central hole for the passage of the electrodes, imperforate metallic closing caps with inwardly turned threaded sleeves, the latter being provided with closed central bores threaded into and tightly secured in the threaded openings of said disk member, said sleeves receiving the ends of the electrodes within their bores, a refilling stopper tightly secured within said disk member, two annular contact making means arranged on the outside of said container at a distance from each other and insulated from each other, each of said contact making means being connected with one of the metallic caps receiving said electrodes.

2. A portable flashlight assembly with a rechargeable secondary battery, comprising a transparent container forming simultaneously the handle of the flashlight and the container of the rechargeable battery, provided with an imperforate end wall at one end, the container having inner threads at the other end, a disk shaped member for closing said container at the threaded end in a fluid tight manner, said member being provided with two threaded openings, electrodes for said battery spaced apart at their ends, said ends projecting into the openings of the said disk shaped member, imperforate metallic closing caps provided with inwardly turned sleeves, each having a central bore closed at the outward end, said caps being threaded and screwed into the threaded openings of the disk member with the said sleeves receiving the snugly fitting ends of the electrodes within said bores, two annular contacting making members on said container arranged at a distance from each other and insulated from each other, wires embedded into the wall of the container with projecting portions, each wire being connected with one of said contact making means and with one of said electrode receiving caps, a charging container provided with two annular contact making means arranged at a distance from each other and insulated from each other, adapted to be attached to the said first named container so as to form part of a portable unit with the annular contact making means on the first named container in operative contact with the annular contact making means of the charging container, said charging container being provided with rectifying means for the recharging of the battery and with further means for connection with the source of current.

3. A portable flashlight assembly with a rechargeable secondary battery, rechargeable in a fixed charging device with contacts operatively connected with the source of current, comprising a transparent container forming simultaneously the handle of the flashlight and the container of the rechargeable battery, provided with an imperforate end wall at one end and further provided with longitudinal grooves, a threaded disk shaped member closing said container at the other end, the latter being provided with corresponding threads engaging those of the disk shaped member, electrodes for said battery spaced apart near the end close to the disk member and converging towards each other and passing through the center section of the container, imperforate metallic closing caps with inwardly turned central sleeves provided with closed bores fastened to said disk member in a fluid tight manner with the closed ends of the caps projecting outwardly while the sleeves pass through the disk members into the interior of the container, said sleeves receiving the ends of the two electrodes within the closed bores which are tightly fitting over the said electrodes, contact springs arranged in the grooves of the transparent container, wires embedded within the walls of the container each connected with one of said springs and with one of said metal caps receiving the ends of the electrodes respectively, said contacts within the grooves being adapted to make contacts with corresponding contacts in a charging device.

4. In a portable flashlight assembly with a rechargeable secondary battery and adapted to be inserted into a charging device as claimed in claim 3, wherein the charging device comprises a tubular container adapted to enclose and to hold the portable flashlight container, elastic longitudinal contact strips for frictional contact with the contact strips of the flashlight container in the grooves, a connector for supplying the charging device with current, said connector being connected with both contact strips, a rectifying cell with its output ends connected with the said contact strips of said tubular charging container and means for connecting the input end of the rectifier cell with the source of current.

WALTER ARTHUR WERNER.

REFERENCES CITED

The following references are of record in the file of this patent:

UNITED STATES PATENTS

| Number | Name | Date |
|---|---|---|
| 1,333,077 | Jackson | Mar. 9, 1920 |
| 1,469,783 | Essington | Oct. 9, 1923 |
| 1,506,302 | Hopkins | Aug. 26, 1924 |
| 1,506,303 | Hopkins | Aug. 26, 1924 |
| 2,218,356 | Manne | Oct. 15, 1940 |
| 2,236,338 | Emanuel | Mar. 25, 1941 |
| 2,293,284 | Emanuel | Aug. 18, 1942 |
| 2,410,527 | Schinske | Nov. 5, 1946 |
| 2,416,651 | Smyth | Feb. 25, 1947 |
| 2,416,755 | James | Mar. 4, 1947 |
| 2,534,582 | Emanuel | Dec. 19, 1950 |

FOREIGN PATENTS

| Number | Country | Date |
|---|---|---|
| 819 | Great Britain | of 1912 |